United States Patent
Abdella et al.

(10) Patent No.: US 12,479,343 B1
(45) Date of Patent: Nov. 25, 2025

(54) MODULAR FAN ATTACHMENT

(71) Applicant: LEAR CORPORATION, Southfield, MI (US)

(72) Inventors: David J. Abdella, Farmington Hills, MI (US); Steven Ziolkowski, Farmington Hills, MI (US); Samuel Blair, Rochester, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 18/779,355

(22) Filed: Jul. 22, 2024

(51) Int. Cl.
- *B60N 2/56* (2006.01)
- *F04D 29/08* (2006.01)
- *F04D 29/42* (2006.01)

(52) U.S. Cl.
CPC ......... *B60N 2/5621* (2013.01); *B60N 2/5657* (2013.01); *F04D 29/083* (2013.01); *F04D 29/4226* (2013.01)

(58) Field of Classification Search
CPC ... B60N 2/5621; B60N 2/5657; F04D 29/083; F04D 29/4226
See application file for complete search history.

(56) References Cited

U.S. PATENT DOCUMENTS

| | | | |
|---|---|---|---|
| 10,752,145 B2 * | 8/2020 | Steinberger | A61H 9/0078 |
| 2004/0036326 A1 * | 2/2004 | Bajic | B60N 2/5657 297/180.14 |
| 2007/0176471 A1 * | 8/2007 | Knoll | B60N 2/665 297/180.14 |
| 2010/0038937 A1 | 2/2010 | Andersson et al. | |
| 2013/0137361 A1 | 5/2013 | Zhong et al. | |
| 2015/0329027 A1 * | 11/2015 | Axakov | B60N 2/5621 297/180.13 |
| 2018/0361892 A1 * | 12/2018 | Iacovone | B60N 2/5685 |
| 2022/0314850 A1 * | 10/2022 | Powell | B60N 2/5685 |
| 2022/0410773 A1 * | 12/2022 | Pharate | F04D 17/16 |

* cited by examiner

*Primary Examiner* — Andrew J Marien
(74) *Attorney, Agent, or Firm* — Carlson, Gaskey & Olds, P.C.

(57) ABSTRACT

An assembly includes a carrier sheet associated with one or more fluid bladders and a fan assembly comprising at least a first housing portion positioned on one side of the carrier sheet and a second housing portion positioned on an opposite side of the carrier sheet. At least one first raised portion extends outwardly from one side of the first housing portion, and at least one second raised portion extends outwardly from one side of the second housing portion. The at least one first raised portion is offset from the at least one second raised portion such that a portion of the carrier sheet is captured between the at least one first raised portion and the at least one second raised portion when the first housing portion and the second housing portion are attached to each other.

20 Claims, 5 Drawing Sheets

MODULAR FAN ATTACHMENT

BACKGROUND

Seats may include climate control systems for seat occupant comfort. One type of climate controlled vehicle seat is a ventilated seat. Ventilated seats often use fans mounted within foam cushions to circulate air toward an occupant.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be understood that terms such as "about," "substantially," and "generally" are not intended to be boundaryless terms, and should be interpreted consistent with the way one skilled in the art would interpret those terms.

This disclosure relates to a fan assembly having a housing and a fan mounting bracket that are positioned on opposing sides of a carrier sheet, and which are attached to each other such that material of the carrier sheet forms a sealed interface between the fan mounting bracket and the housing.

Figures 1, 2:
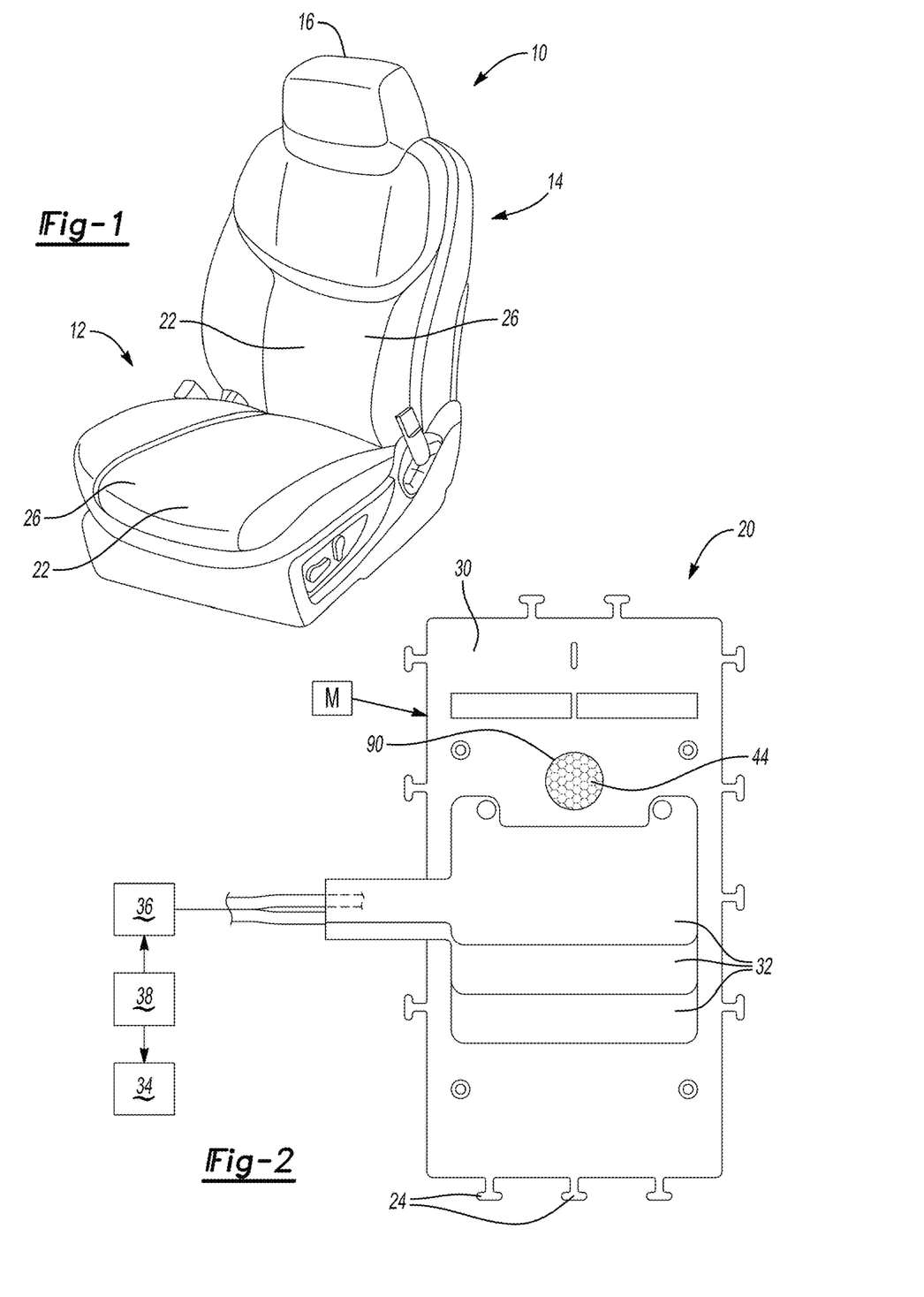
FIG. 1 is a perspective view of an example seat.
FIG. 2 is a top view of an example carrier sheet and bladder assembly to be associated with a fan assembly.

FIG. 1 illustrates a seat assembly 10 according to one example embodiment. The seat assembly 10 may be utilized as a vehicle seat assembly 10 for seating in a vehicle, such as an automobile, an aircraft, a watercraft, or any other seating environment. The seat assembly 10 includes a seat bottom 12, which may be adapted to be mounted for motor-driven adjustable translation in a fore and aft direction and in an up and down direction of a vehicle. The seat assembly 10 includes a seat back 14, which may be pivotally connected to the seat bottom 12 to extend generally upright relative to the seat bottom 12 for pivotal adjustment about an axis relative to the seat bottom 12.

The seat back 14 may include a head restraint 16 that may be configured to support the head of a seat occupant. The head restraint 16 may be disposed at the top of the seat back 14. The head restraint 16 may be unitary with the seat back 14 or may be a separate component that is adjustably positionable with respect to the top of the seat back 14. The seat bottom 12 may be configured to support a seat occupant. In a vehicular application, the seat bottom 12 may be mounted to a support surface, such as a vehicle floor. It should be understood that this is just one example of a seat configuration, and that other configurations could also be utilized.

The seat back 14 and the seat bottom 12 may each have at least one seat component 20 (FIG. 2) associated with a cushion 22 in the seat bottom 12 and/or the seat back 14. A trim cover 26 may be disposed over or upon the cushions 22 and may cover the seat component 20. The trim cover 26 provides at least a portion of a visible exterior surface of the seat assembly 10. The seat component 20 may be secured to the cushion 22 and/or trim cover 26 with one or more retention members 24. The trim cover 26 may include a plurality of trim panels that may be assembled in any suitable manner, such as by stitching. The trim panels may be made of any suitable material or materials, such as fabric, leather, vinyl, or combinations thereof.

Figure 3:
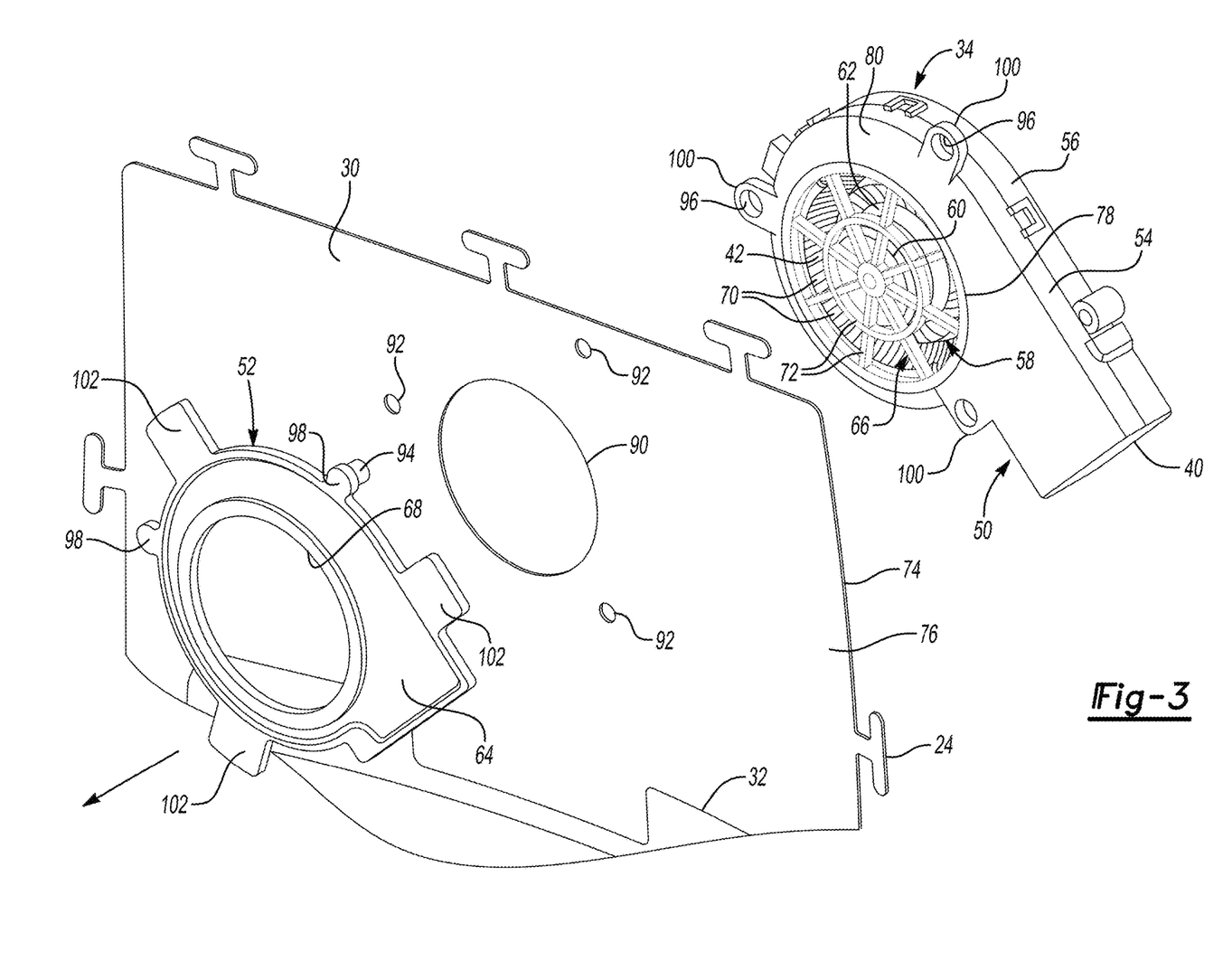
FIG. 3 is an exploded view of one example configuration of a carrier sheet, fan assembly with a grill, and fan mounting bracket.

FIG. 2 shows an example of a seat component 20 comprising a trim module M associated with at least one of the seat back 14 and the seat bottom 12. In implementations, the trim module M may include a carrier sheet 30, one or more fluid bladders 32 supported by the carrier sheet 30, and a blower and/or fan assembly 34 (FIG. 3). In one example, the carrier sheet includes integrated retention members 24 that attach the trim module M to the trim cover 26 and/or cushion 22. The trim module M is concealed by or disposed under the trim cover 26 and is disposed on the cushion 22. In one example, the retention members 24 comprise attachment tabs, t-tabs, fingers, flanges, or other similar structures; however, other types of connectors could also be used.

In one example, the fluid bladders 32 that are associated with the carrier sheet 30 comprise an inflatable device, e.g., discrete inflatable/deflatable pouches or cells, for enhancing comfort of a seat occupant, such as for a lumbar support and/or massage purposes. In one example, the carrier sheet 30 may comprise a vent bag which includes spacer fabric 44 to allow air to pass through the seat when occupied. Air is typically moved through the seat with an electrically powered fan assembly 34. In implementations, the fan assembly 34 must make an airtight or nearly airtight connection to the carrier sheet 30 to ensure adequate airflow. The subject disclosure utilizes the carrier sheet 30 itself to provide the sealed interface. This eliminates the need for the use of screws, snap rings, adhesives, foam/rubber gaskets, etc.

In implementations, the carrier sheet 30 comprises a Thermoplastic Polyurethane (TPU) material, for example.

In one example, the one or more fluid bladders 32 are separately attached to the carrier sheet 30 as shown in FIG. 2.

In one example, the one or more fluid bladders 32 are integrated within the carrier sheet 30, e.g., integrally formed with the carrier sheet, as schematically shown in FIG. 3.

In implementations, an actuator assembly 36 controls inflation of the bladders 32. The actuator assembly 36 may include a compressor or pneumatic pump connected to a valve bank to provide a source of fluid to the bladders 32. A seat control module is associated with the seat assembly 10, and is identified generally as one or more controllers 38. In one example, the one or more controllers 38 regulate compressed air into and out of the bladders 32 in the seat assembly 10. The one or more controllers 38 and actuator assembly 36 may be installed in the seat back 14, or installed under the seat, or anywhere suitable in the vehicle.

The one or more controllers 38 may include a processing unit and non-transitory memory for executing various control strategies. The processing unit can be a custom made or commercially available processor, a central processing unit (CPU), or generally any device for executing software instructions. The memory can include any one or combination of volatile memory elements and/or nonvolatile memory elements. The processing unit can be programmed to execute one or more programs stored in the memory. The programs may be stored in the memory as software code, for example. The programs stored in the memory may include one or more additional or separate programs, each of which includes an ordered list of executable instructions for implementing logical functions associated with controlling the valve bank. While shown as a single controller, the controller may be comprised of one or more controllers. The controllers may also be in communication with, and responsive to instructions from, another controller.

In implementations, the one or more controllers 38 also control operation of the fan assembly 34.

In one example, the fan assembly 34 has at least one inlet 40 and at least one outlet 42 that are in communication with a passenger compartment of a vehicle. This allows the fan assembly 34 to move air from the passenger compartment through the foam pads/cushions of the seat 10. A ventilated seat may be made for pushing air or for pulling air. In a typical pushing air system, the fan forces air into channels in the foam pad, and out through the upholstery layer. In a typical pulling air system, the fan draws air into the seat through the upholstery, through channels in the foam pad, and the air is expelled from the seat.

In one example, the fan assembly 34 includes a first housing portion 50 and a second housing portion 52 as shown in FIG. 3. In implementations, the first housing portion 50 may comprise a main housing body comprised of a first piece 54 attached to a second piece 56 to provide an internal cavity 58 that is open to an opening 60 formed in the first piece 54. A fan rotor 62 is mounted within the internal cavity 58 to circulate air, and operation of the rotor 62 is selectively controlled via the one or more controllers 38.

In implementations, the first housing portion 50 may have a grill 66 that overlaps the opening 60 as shown in FIG. 3. In one example, the grill 66 comprises a grid pattern having openings 70 between grid elements 72 to allow air to flow through the openings 70, while also preventing objects from coming into contact with the rotating fan rotor 62. In this example, the second housing portion 52 may comprise a housing cover or fan mounting bracket 64 with a main opening 68 that surrounds the grill 66.

Figure 5A:
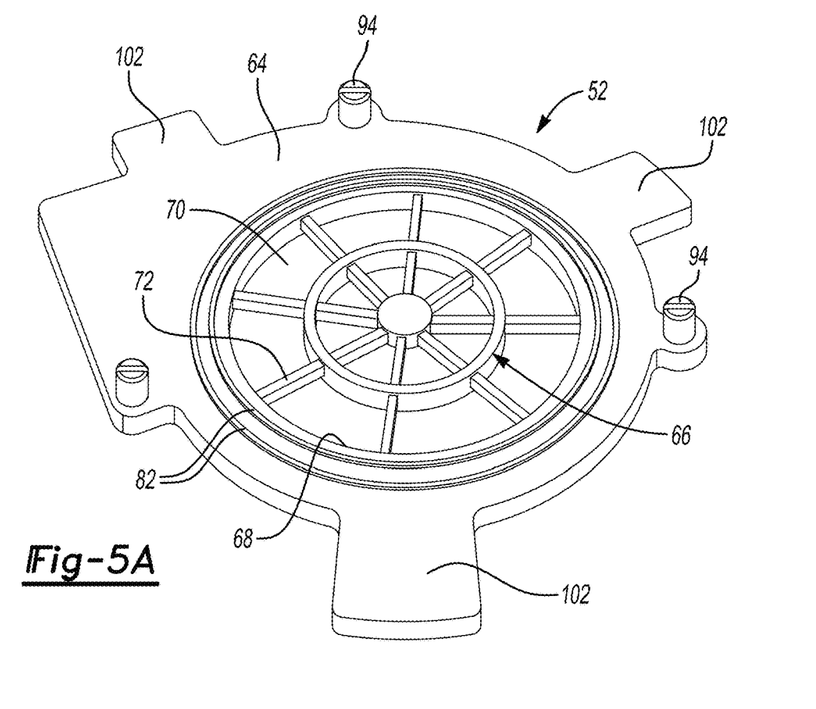
FIG. 5A shows a top view of another example configuration where an inner facing surface of a fan mounting bracket includes a grill.

In other implementations, the second housing portion 52 may comprise a housing cover or fan mounting bracket 64 that has the grill 66 (FIG. 5A) that covers the opening 60 in the first housing portion 50. In one example, the fan mounting bracket 64 includes a main opening 68 and the grill 66 provides the grid pattern having openings 70 between grid elements 72 to allow air to flow through the openings 70, while also preventing objects from coming into contact with the rotating fan rotor 62.

In implementations, the first housing portion 50 is positioned on one side 74 of the carrier sheet 30 and the second housing portion 52 is positioned on an opposite side 76 of the carrier sheet 30.

Figure 4A:
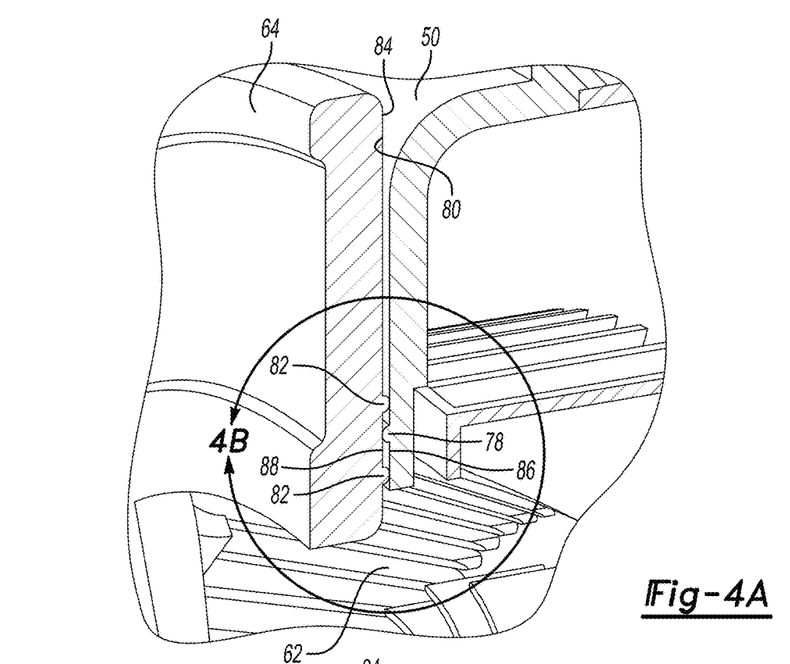
FIG. 4A is perspective section view of a sealed interface area between a main fan housing and the fan mounting bracket but without the carrier sheet.
Figure 4B:
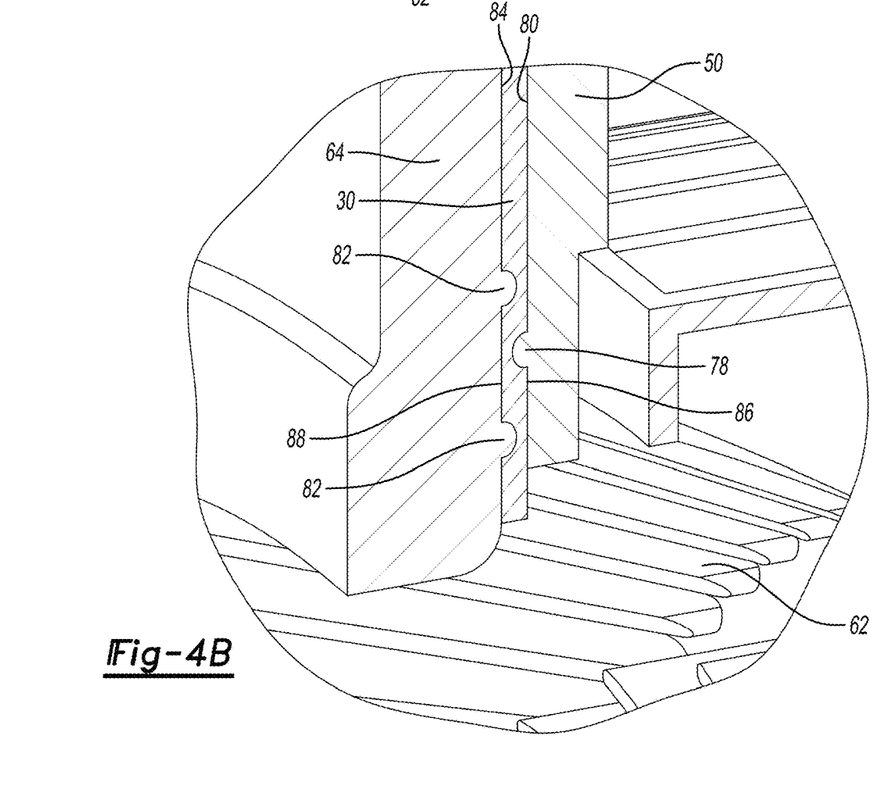
FIG. 4B is an enlarged view of the sealed interface as identified in FIG. 4A but which also includes the carrier sheet.

In one example shown in FIGS. 4A-B, at least one first raised portion 78 extends outwardly from one side 80 of the first housing portion 50, and at least one second raised portion 82 extends outwardly from one side 84 of the second housing portion 50. In implementations, the at least one first raised portion 78 is offset from the at least one second raised portion 82 such that a portion of material of the carrier sheet 30 is captured or clamped between the at least one first raised portion 78 and the at least one second raised portion 82 when the first housing portion 50 and the second housing portion 52 are attached to each other.

In one example, the at least one first raised portion 78 comprises one or more raised annular rings extending around the opening 60 of the first housing portion 50.

In one example, the at least one second raised portion 82 comprises one or more raised annular rings (FIG. 5A) extending around the grill opening 68 of the second housing portion 52. In implementations, the first raised portion 78 is radially offset from the second raised portion 82 relative to an axis A defined by the opening 60 in the main fan housing 50. The alternating annular rings 78, 82 help seal the carrier sheet 30 to the fan assembly 34 and lock fan assembly 34 in a correct mounting position.

This enables the fan assembly 34 to be assembled to the carrier sheet layer of the trim module without additional fasteners, gaskets, or adhesives. The mounting bracket 64 and main fan housing 50 leverage the carrier sheet layer to provide a sealed interface to eliminate the need for additional sealing layers and materials. The carrier sheet material that is pinched/clamped between the main fan housing 50 and mounting bracket 64 creates an air seal.

As shown in FIG. 4B, the carrier sheet 30 is clamped between opposing surfaces 86, 88 of the first housing portion 50 and the second housing portion 52 that are adjacent to the offset raised portions 78, 82. This allows the carrier sheet 30 to follow a serpentine path, e.g., S-shaped path, along a radial direction to form the sealed interface between the fan assembly 34 and the carrier sheet 30.

As shown in FIG. 3, the carrier sheet 30 includes a central opening 90 aligned with the opening 60 located within the first housing portion 50 and aligned with the opening 68 in the fan mounting bracket 64. In implementations, the carrier sheet 30 includes one or more attachment openings 92 that are spaced circumferentially about the central opening 90.

Figure 5B:
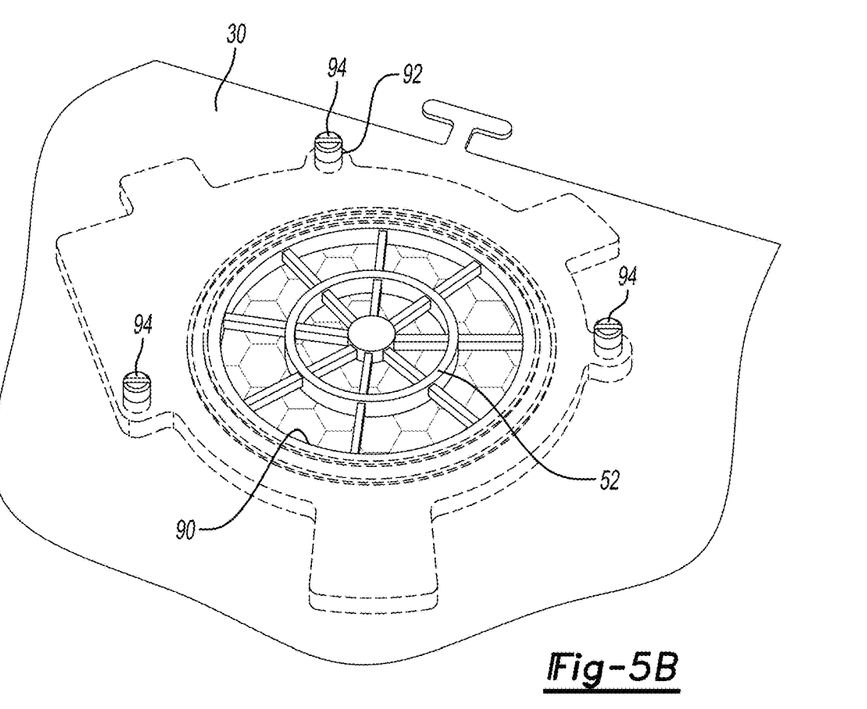
FIG. 5B shows the fan mounting bracket of FIG. 5A assembled to the carrier sheet.
Figure 5C:
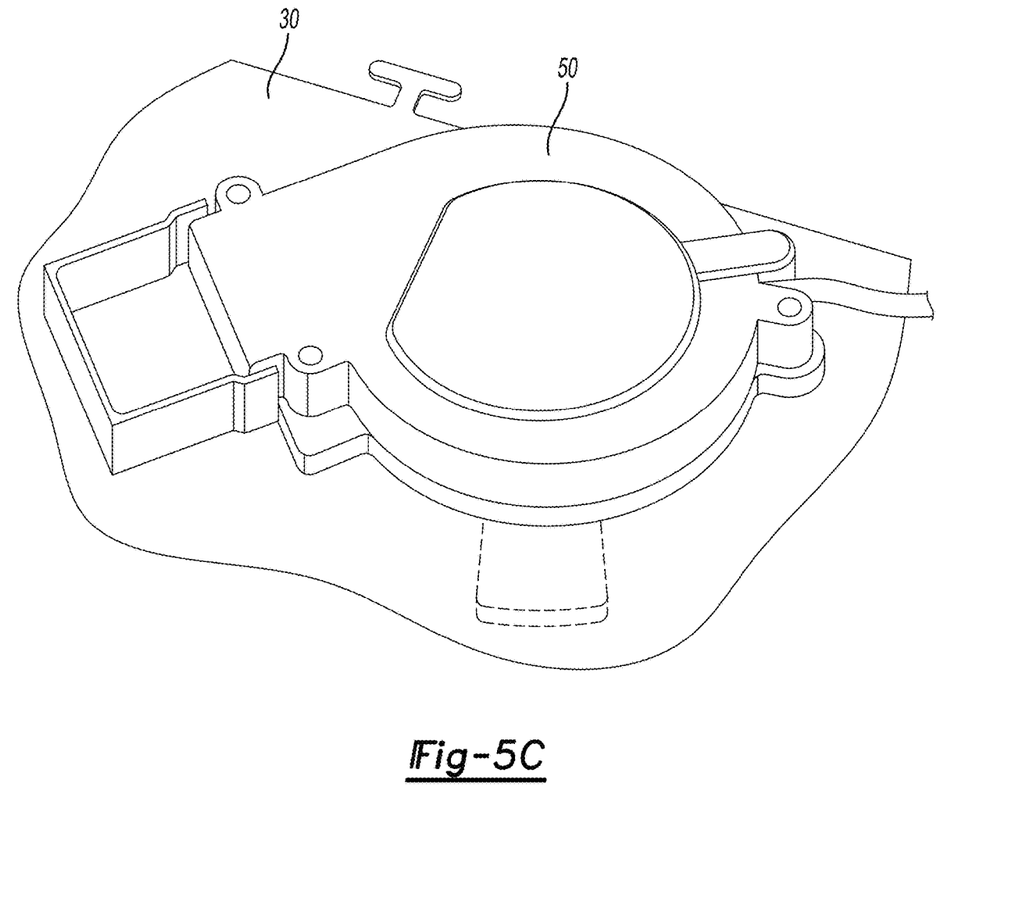
FIG. 5C shows the main fan housing assembled to the carrier sheet and fan mounting bracket of FIG. 5B.

In implementations, one of the first housing portion 50 and the second housing portion 52 include one or more snap pins 94, and the other of the first housing portion 50 and the second housing portion 52 include one or more receptacles 96. The one or more snap pins 94 fit through the attachment openings 92 (FIG. 5B) in the carrier sheet 30 and are received within the receptacles 96 to connect the first housing portion 50 and the second housing portion 52 together, as well as to fix the fan assembly 34 to the carrier sheet 30 (FIG. 5C).

In the example shown in FIG. 3, the snap pins 94 are formed on extension portions 98 of the fan mounting bracket 64. The extension portions 98 are circumferentially spaced about an outer periphery of the fan mounting bracket 64. In one example, the snap pins 94 may comprise tabs, protrusions, cylindrical bodies, or other similar structures.

In the example shown in FIG. 3, the receptacles 96 are formed on extension portions 100 of the main fan housing 50. The extension portions 100 are circumferentially spaced about an outer periphery of the first piece 54 of the main fan housing 50. In one example, the receptacles 96 may comprise openings, pockets, slots, recesses or other similar structures that receive the snap pins 94.

In implementations, one of the first housing portion 50 and the second housing portion 52 includes one or more wings 102 spaced about an outer periphery. In one example, the one or more wings 102 comprise planar extensions that extend in a radially outward direction and provide additional support for the fan assembly 34 and to keep the fan from falling through the foam.

In the example shown in FIG. 3, the wings 102 are formed on the fan mounting bracket 64.

The subject disclosure provides for a method and assembly to seal a fan assembly to a carrier sheet to provide an integrated trim module.

In one example, a method comprises: forming at least one first raised portion extending outwardly from a first side of a first housing portion of a fan assembly; forming at least one second raised portion extending outwardly from a first side of a second housing portion of the fan assembly; positioning the first side of the first housing portion to face one side of a carrier sheet; positioning the first side of the second housing portion to face an opposite side of the carrier sheet; offsetting the at least one first raised portion from the at least one second raised portion; and sealing the fan assembly to the carrier sheet by capturing a portion of the carrier sheet between the at least one first raised portion and the at least one second raised portion when the first housing portion and the second housing portion are attached to each other.

The method may also include the following. In implementations, the at least one first raised portion comprises one or more raised first annular surfaces and the at least one second raised portion comprises one or more raised second annular, and the method may include: alternating the one or more raised first annular surfaces with the one or more raised second annular surfaces in a radial direction relative to a center axis defined by the fan assembly such that the carrier sheet follows a serpentine path along the radial direction and forms a sealed interface between the fan assembly and the carrier sheet.

In one example, an assembly comprises: a carrier sheet associated with one or more fluid bladders; a fan assembly comprising at least a first housing portion positioned on one side of the carrier sheet and a second housing portion positioned on an opposite side of the carrier sheet; at least one first raised portion extending outwardly from one side of the first housing portion; and at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other.

The assembly may also include any of the following in any combination thereof.

In one example, the carrier sheet is clamped between surfaces of the first housing portion and second housing portion that are adjacent to the at least one first raised portion and the at least one second raised portion and extend along a sealed interface.

In one example, the at least one first raised portion comprises one or more raised first annular surfaces and the at least one second raised portion comprises one or more raised second annular surfaces that alternate with the one or more raised first annular surfaces such that the carrier sheet follows a serpentine path along a radial direction and forms a sealed interface between the fan assembly and the carrier sheet.

In one example, the carrier sheet includes a central opening aligned with a fan rotor located within the first housing portion.

In one example, the second housing portion includes a grill aligned with the central opening.

In one example, the carrier sheet includes one or more attachment openings spaced circumferentially about the central opening.

In one example, one of the first housing portion and the second housing portion include one or more snap pins, and the other of the first housing portion and the second housing portion include one or more receptacles that receive the one or more snap pins.

In one example, the one or more snap pins fit through the one or more attachment openings in the carrier sheet and are received within the one or more receptacles.

In one example, one of the first housing portion and the second housing portion includes one or more wings spaced about an outer periphery.

In one example, the carrier sheet comprises a thermoplastic polyurethane material, and including at least of: one or more fluid bladders attached to the carrier sheet; one or more fluid bladders integrated within the carrier sheet.

In one example, the carrier sheet comprises a trim module associated with a seat.

In one example, a seat assembly comprises: a seat bottom; a seat back supported relative to the seat bottom; and a trim module associated with at least one of the seat back and the seat bottom, wherein the trim module comprises: a carrier sheet; one or more fluid bladders supported by the carrier sheet; a fan assembly defining a center axis and comprising at least a first housing portion positioned on one side of the carrier sheet and a second housing portion positioned on an opposite side of the carrier sheet; at least one first raised portion extending outwardly from one side of the first housing portion; and at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other.

The seat assembly may also include any of the following in any combination thereof.

In one example, the at least one first raised portion comprises one or more raised first annular surfaces and the at least one second raised portion comprises one or more raised second annular surfaces that alternate with the one or more raised first annular surfaces such that the carrier sheet follows a serpentine path along a radial direction relative to the center axis and forms a sealed interface between the fan assembly and the carrier sheet.

In one example, the first housing portion comprises a main fan housing, and wherein the carrier sheet includes a central opening aligned with a fan rotor located within the main fan housing.

In one example, the second housing portion comprises a fan mounting bracket that includes a grill aligned with the central opening.

In one example, the carrier sheet includes one or more attachment openings spaced circumferentially about the central opening; one of the main fan housing and the fan mounting bracket include one or more snap pins; and the other of the main fan housing and the fan mounting bracket include one or more receptacles that receive the one or more snap pins.

In one example, the one or more snap pins fit through the one or more attachment openings in the carrier sheet and connect the main fan housing and the fan mounting bracket together.

In one example, the fan mounting bracket includes one or more wings spaced about an outer periphery.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An assembly comprising:
a carrier sheet associated with one or more fluid bladders;
a fan assembly comprising at least a first housing portion positioned on one side of the carrier sheet and a second housing portion positioned on an opposite side of the carrier sheet;
at least one first raised portion extending outwardly from one side of the first housing portion; and
at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other and forms a sealed interface between the fan assembly and the carrier sheet.

2. The assembly of claim 1, wherein the carrier sheet is clamped between surfaces of the first housing portion and second housing portion that are adjacent to the at least one first raised portion and the at least one second raised portion and extend along a sealed interface.

3. The assembly of claim 1, wherein the carrier sheet includes a central opening aligned with a fan rotor located within the first housing portion.

4. The assembly of claim 3, wherein one of the first housing portion and the second housing portion includes a grill aligned with the central opening.

5. The assembly of claim 3, wherein the carrier sheet includes one or more attachment openings spaced circumferentially about the central opening.

6. The assembly of claim 5, wherein one of the first housing portion and the second housing portion include one or more snap pins, and the other of the first housing portion and the second housing portion include one or more receptacles that receive the one or more snap pins.

7. The assembly of claim 6, wherein the one or more snap pins fit through the one or more attachment openings in the carrier sheet and are received within the one or more receptacles.

8. The assembly of claim 1, wherein one of the first housing portion and the second housing portion includes one or more wings spaced about an outer periphery.

9. The assembly of claim 1, wherein the carrier sheet comprises a thermoplastic polyurethane material, and including at least one of the:
one or more fluid bladders attached to the carrier sheet;
one or more fluid bladders integrated within the carrier sheet.

10. The assembly of claim 1, wherein the carrier sheet comprises a trim module associated with a seat.

11. An assembly comprising:
a carrier sheet associated with one or more fluid bladders;
a fan assembly comprising at least a first housing portion positioned on one side of the carrier sheet and a second housing portion positioned on an opposite side of the carrier sheet;
at least one first raised portion extending outwardly from one side of the first housing portion; and
at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other, and wherein the at least one first raised portion comprises one or more raised first annular surfaces and the at least one second raised portion comprises one or more raised second annular surfaces that alternate with the one or more raised first annular surfaces such that the carrier sheet follows a serpentine path along a radial direction and forms a sealed interface between the fan assembly and the carrier sheet.

12. A seat assembly comprising:
a seat bottom;
a seat back supported relative to the seat bottom; and
a trim module associated with at least one of the seat back and the seat bottom, wherein the trim module comprises:
a carrier sheet;
one or more fluid bladders supported by the carrier sheet;
a fan assembly defining a center axis and comprising at least a first housing portion positioned on one side of the carrier sheet and a second housing portion positioned on an opposite side of the carrier sheet;
at least one first raised portion extending outwardly from one side of the first housing portion; and
at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other and forms a sealed interface between the fan assembly and the carrier sheet.

13. The seat assembly of claim 12, wherein the first housing portion comprises a main fan housing, and wherein the carrier sheet includes a central opening aligned with a fan rotor located within the main fan housing.

14. The seat assembly of claim 13, wherein the second housing portion comprises a fan mounting bracket that includes a grill aligned with the central opening.

15. The seat assembly of claim 14, wherein:
the carrier sheet includes one or more attachment openings spaced circumferentially about the central opening;
one of the main fan housing and the fan mounting bracket include one or more snap pins; and
the other of the main fan housing and the fan mounting bracket include one or more receptacles that receive the one or more snap pins.

16. The seat assembly of claim 15, wherein the one or more snap pins fit through the one or more attachment openings in the carrier sheet and connect the main fan housing and the fan mounting bracket together.

17. The seat assembly of claim 14, wherein the fan mounting bracket includes one or more wings spaced about an outer periphery.

18. A seat assembly comprising:
a seat bottom;
a seat back supported relative to the seat bottom; and
a trim module associated with at least one of the seat back and the seat bottom, wherein the trim module comprises:
a carrier sheet;
one or more fluid bladders supported by the carrier sheet;
a fan assembly defining a center axis and comprising at least a first housing portion positioned on one side of the carrier sheet and a second housing portion positioned on an opposite side of the carrier sheet;
at least one first raised portion extending outwardly from one side of the first housing portion; and
at least one second raised portion extending outwardly from one side of the second housing portion, wherein the at least one first raised portion is offset from the at least one second raised portion such that a portion of the carrier sheet is captured between the at least one first raised portion and the at least one second raised portion when the first housing portion and the second housing portion are attached to each other, and wherein the at least one first raised portion comprises one or more raised first annular surfaces and the at least one second raised portion comprises one or more raised second annular surfaces that alternate with the one or more raised first annular surfaces such that the carrier sheet follows a serpentine path along a radial direction relative to the center axis and forms a sealed interface between the fan assembly and the carrier sheet.

19. A method comprising:
forming at least one first raised portion extending outwardly from a first side of a first housing portion of a fan assembly;
forming at least one second raised portion extending outwardly from a first side of a second housing portion of the fan assembly;
positioning the first side of the first housing portion to face one side of a carrier sheet;
positioning the first side of the second housing portion to face an opposite side of the carrier sheet;
offsetting the at least one first raised portion from the at least one second raised portion; and
sealing the fan assembly to the carrier sheet by capturing a portion of the carrier sheet between the at least one first raised portion and the at least one second raised portion when the first housing portion and the second housing portion are attached to each other.

20. The method of claim 19, wherein the at least one first raised portion comprises one or more raised first annular surfaces and the at least one second raised portion comprises one or more raised second annular surfaces, and including:
alternating the one or more raised first annular surfaces with the one or more raised second annular surfaces in a radial direction relative to a center axis defined by the fan assembly such that the carrier sheet follows a serpentine path along the radial direction and forms a sealed interface between the fan assembly and the carrier sheet.

* * * * *